United States Patent [19]

Ivony et al.

[11] 4,230,020
[45] Oct. 28, 1980

[54] INTEGRAL SERVO STEERING GEAR WITH RACK TRANSMISSION

[76] Inventors: József Ivony, Hegedüs Gyula utca 50; Imre Lendvai, Árpád utca 35; László Szücs, Batthyanyi utca 14; József Orbán, Alsóhegyi ut 7, all of Budapest, Hungary

[21] Appl. No.: 888,773

[22] Filed: Mar. 21, 1978

Related U.S. Application Data

[63] Continuation-in-part of Ser. No. 671,298, Mar. 29, 1976, abandoned.

[51] Int. Cl.² .......................... F15B 9/10; F15B 13/04
[52] U.S. Cl. .................................. 91/422; 91/391 R; 91/467
[58] Field of Search ................ 91/375 A, 375 R, 422

[56] References Cited

U.S. PATENT DOCUMENTS

| | | | |
|---|---|---|---|
| 3,291,002 | 12/1966 | Folkerts | 91/375 A |
| 3,359,866 | 12/1967 | Folkerts | 91/375 A |
| 3,465,842 | 9/1969 | Hruska | 91/375 A |
| 3,508,467 | 4/1970 | Folkerts | 91/375 A |
| 3,606,819 | 9/1971 | Venoble et al. | 91/375 A |
| 3,722,368 | 3/1973 | Suzuki | 91/422 |

Primary Examiner—Paul E. Maslousky
Attorney, Agent, or Firm—Warren, Chickering & Grunewald

[57] ABSTRACT

Hydraulic servo steering gear having a cylindrical, double-acting working piston connected to a steering shaft by a rack-and-sector gear connection, especially for motor vehicles comprises a piston-and-sleeve type control mechanism arranged in the working piston. The cylindrical outer surface of the sleeve of the control mechanism is fitted loosely, with a radial gap, in the seat formed therefor in the double-acting working piston. The control sleeve is secured against axial and angular displacement.

5 Claims, 5 Drawing Figures

INTEGRAL SERVO STEERING GEAR WITH RACK TRANSMISSION

The present application is a continuation-in-part of application Ser. No. 671,298 filed Mar. 29, 1976, now abandoned.

BACKGROUND OF THE INVENTION

1. Field of the Invention

The invention concerns an integral servo steering gear with a rack-type transmission wherein the control mechanism is disposed in the working piston.

2. Description of the Prior Art

Servo steering gear is known wherein a portion of the working piston is formed as a rack meshing with the teeth of a toothed sector gear of a steering shaft. In this way the advance of the working piston is translated into rotary motion of the steering shaft by the rack-and-pinion connection. Servo steering gear provided with rack and sector gear transmission frequently has the control mechanism disposed in the working piston see example U.S. Pat. No. 3,722,368. This constructional arrangement is such that a control sleeve is closely fitted to the control piston and is secured against axial and angular displacement so as to form a single constructional unit with the piston. As a consequence of the tight fitting, the hydraulic fluid - usually oil - channels leading to the control mechanism are for the greater part arranged in the piston. On the other hand, the control piston is disposed in the control sleeve so as to be axially or angularly displaceable corresponding to the magnitude of the controlling displacement and is connected with a steering nut. The clearance between the control piston and the control sleeve is of the order of hundredths of millimeters.

It is a disadvantage of this arrangement that, due to the great load on the rack and sector gear connection, the piston is subjected to resilient deformation, as a result of which the annular clearance between the piston and the control sleeve is deformed and the control piston may stick. This in turn has the consequence that the proportionality between the manual pressure and the servo pressure is destroyed, thus the servo-steering becomes insensitive, as it were, and the operation becomes faulty.

Another disadvantage of the known arrangements is that the rack and sector gear connection is not central, i.e. does not fall on the axis of the piston, as a result of which the working piston rocks very slightly in the steering casing or cylinder. This rocking is allowed to happen because of the clearance between the piston and the bore of the steering casing in which it is disposed and because of the resilient deformation. As a consequence of the rocking of the piston, the steering nut journalled by bearings in the piston is also rocked relative to the steering spindle and this causes a certain stress to arise in the threaded connection between the steering nut and the steering spindle as well as in the bearing arrangement of the steering nut and the steering spindle. Since there is a connection between the steering nut and the control piston, the stress in the steering nut has an effect on the control piston also.

Practical drawbacks of the known arrangement are that the bore of the control sleeve can only be finish-machined after the sleeve has been secured in the piston and that the control mechanism may only be examined together with the piston.

SUMMARY OF THE PRESENT INVENTION

The present invention seeks to provide a construction wherein the control sleeve and the control piston are formed as independent units and the sleeve is fitted into the working piston as a loose fit, that is there is a gap between the sleeve and the piston. The oil spaces are however still reliably sealed. As proposed by the invention, the deformation of the piston arising from the rack and sector gear connection is not transmitted to the control mechanism because of the loose fit.

A further advantage sought to be attained by the invention is that the stresses arising from the rocking of the piston are not transmitted to the control piston since the control mechanism is loosely fitted in the piston and can adjust itself to suit the position of the steering nut.

Accordingly, the invention consists in a hydraulic servo steering gear, comprising a steering shaft, a double-acting working piston, a housing in which said working piston is accommodated, a rack and sector gear connection between said steering shaft and said working piston, a steering spindle, journalled in said housing, which, in operation, is rotated to control steering, a steering nut journalled in said working piston, in threaded engagement with the steering spindle, first and second abutment elements secured relative to the steering nut and the working piston, respectively, to limit angular movement of the steering nut relative to the working piston, resilient means fixed between the steering nut and the working piston and, in operation, tending to restore the steering nut and the working piston to a predetermined relative angular position when movement from the said predetermined position occurs, a bore defined in said working piston, a piston-and-sleeve type control mechanism arranged in said bore, an entraining member connecting the steering nut to the piston of the said control mechanism, and securing means positioned to secure said sleeve against angular displacement within said bore of the working piston, the piston of the control mechanism defining a first channel forming part of a connection between the piston surface and a high pressure space at one end of the working piston, the sleeve of the control mechanism defining a second channel forming part of a connection between the interior surface of the sleeve and a further high pressure space at the other end of the working piston, angular movement of the piston of the said control mechanism relative to the sleeve in one direction tending to connect the first channel but not the second channel to an inlet for high pressure liquid, and angular movement of the piston of the said control mechanism relative to the sleeve in the other direction tending to connect the second channel but not the first channel to the inlet for high pressure liquid, the sleeve fitting loosely for high pressure liquid, the sleeve fitting loosely in said bore in a radial sense and, adjacent each end of the control sleeve a respective ring seal is disposed on the outer surface of the sleeve to form an annular space due to said loose fitting, said annular space being in flow connection with a liquid return space.

In the construction proposed herein, the oil channels are essentially in the control sleeve and not in the piston. This has the advantage that the control mechanism can be fabricated as a separate unit and can be examined independently of the piston. The arrangement of the channels is such that the outer surface of the control sleeve is connected with a low pressure space with the advantage that the control mechanism is freed from distortion due to high pressure.

In one construction the angular position of the control sleeve is secured relative to the working piston by adjustable elements and stops which allow the hydraulic centre position of the rotary control mechanism to be adjusted.

DESCRIPTION OF THE PREFERRED EMBODIMENTS

Figure 1:
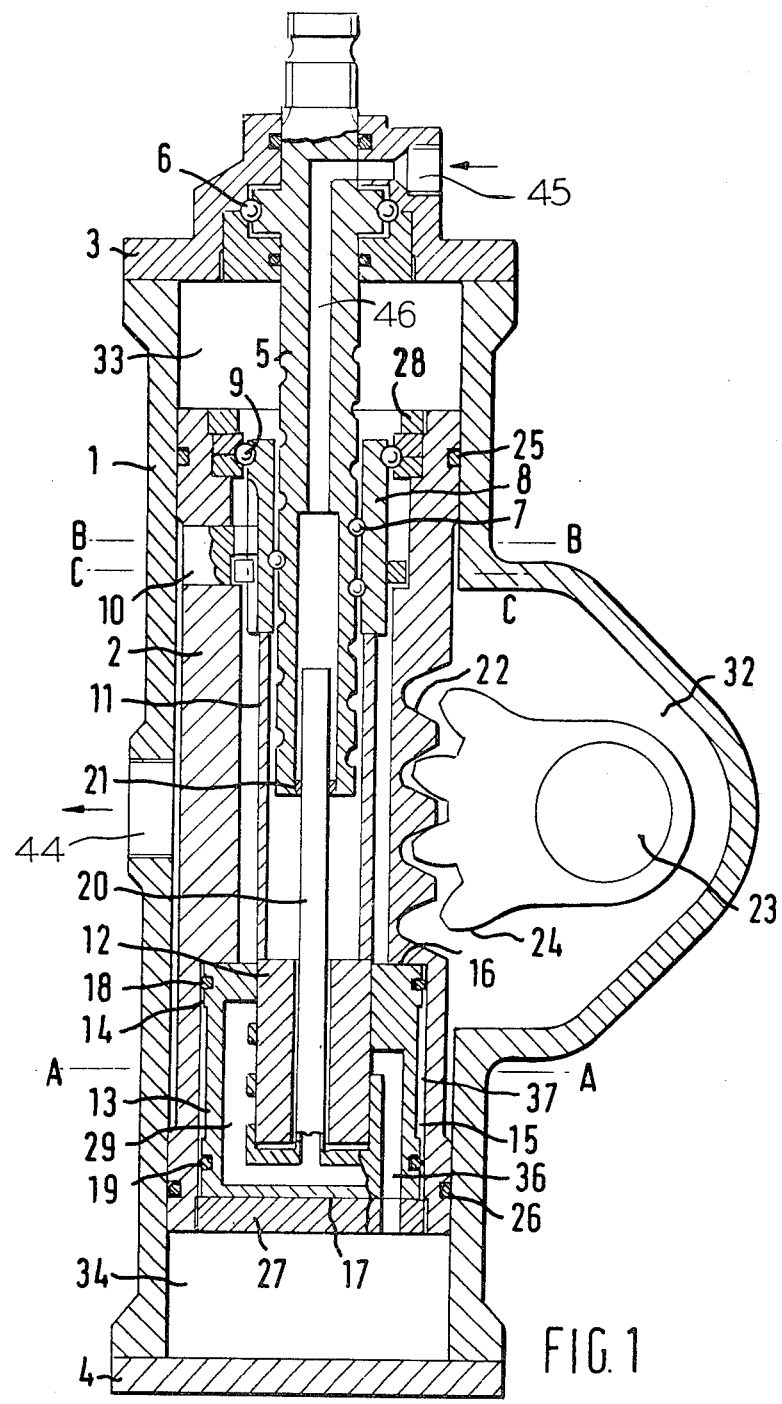
Figure 2:
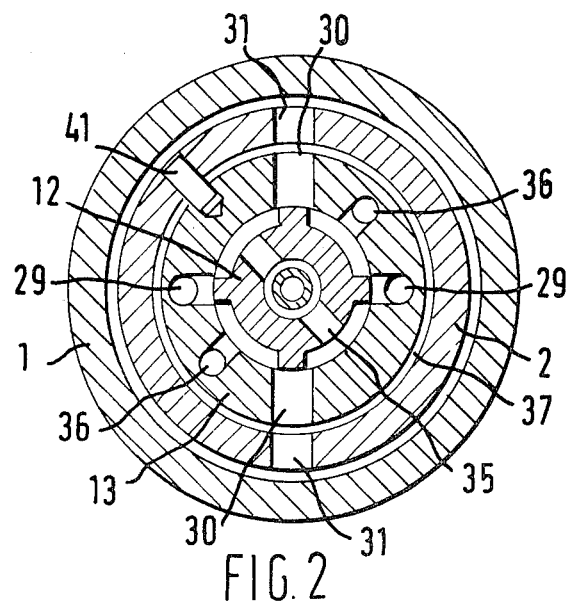
Figure 3:
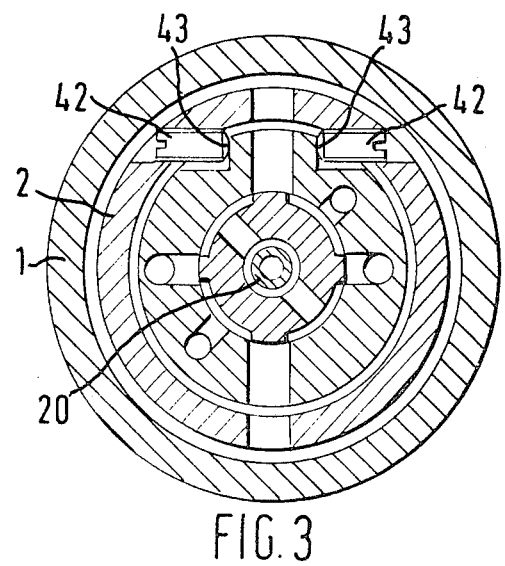
Figure 4:
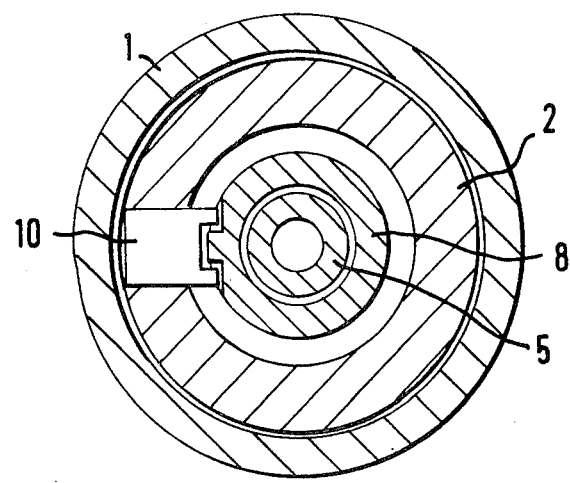
Figure 5:
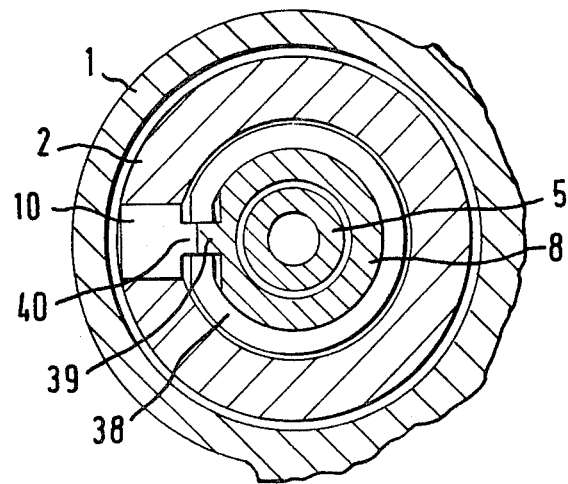

A preferred embodiment of the invention is illustrated, merely by way of example, in the accompanying drawings wherein:

FIG. 1 is a longitudinal section of a servo steering gear according to the invention, FIG. 2 is a transverse section taken on the plane A—A of FIG. 1, FIG. 3 is a variant of the FIG. 2 embodiment, FIG. 4 is a transverse section taken on the plane B—B of FIG. 1, and FIG. 5 is a transverse section taken on the plane C—C of FIG. 1.

The steering housing 1 is closed by covers 3, 4. Balls 6 axially support a steering spindle 5 in the upper cover 3. Threads on the spindle 5 mesh with a steering nut 8 via balls 7. The steering nut 8 is journalled via a ball race 9 in the piston 2 so that it can rotate about its own axis but only to a limited extent corresponding to the extent of the control movement: abutments 10 limit further rotation, in both angular senses. A rotatable piston control unit is mounted in the piston 2. An entraining member 11 connects the nut 8 with a control piston 12 in a control sleeve 13. The outer surface 14 of the control sleeve 13 fits loosely in the bore 15 of the piston 2. The control sleeve 13 has grooves containing resilient sealing rings 18, 19 adjacent to its end surfaces 16, 17. These sealing rings are effective to maintain the sleeve 13 centered in the bore 15. A sliding tube 20 is disposed between the steering spindle 5 and the control sleeve 13 for sealing-sliding in spindle 5, via a sealing ring 21. A rack and sector gear, formed by teeth 22 on the piston 2 meshing with teeth 24 of a steering shaft 23, transmit the servo force. The teeth 24 simultaneously support the piston 2 against rotation. The piston 2 has grooves containing sealing rings, 25, 26. A screw 27 supports the control sleeve 13 axially in the bore 15 of the piston 2. A screw 28 in the piston 2 supports the ball race 9 of steering nut 8.

Oil enters in the bore 45 of the upper cover 3, passes into the longitudinal bore 46 of the steering spindle 5 and into the sliding tube 20. The oil then passes from the lower end of the tube 20 into two channels 29 (see FIGS. 1 and 2) in the control sleeve 13 which guide the oil via control slits to the outer surface of the control piston 12. Via channels 30 in the control sleeve 13 and bores 31 in the piston 2 the oil can discharge into recirculation space 32 which is always at low pressure (LP), and from there via a central bore 44 in housing 1 to the reservoir of the pump.

The space defined by the housing 1, the piston 2 and the upper cover 3 is an upper pressure space 33 while the space defined by the housing 1, the piston 2 and the lower cover 4 is a lower pressure space 34. The upper pressure space 33 is separated from the return flow space 32 by the sealing ring 25 on the piston 2 while the return flow space 32 is separated from the lower pressure space 34 by the sealing ring 26.

A transverse bore 35 (see FIG. 2) in control piston 12 conveys oil by way of the central bore of the sleeve 13 but exterior to the tube 20 past the balls 7 and into the upper pressure space 33 while channels 36 formed in the control sleeve 13 convey it into the lower pressure space 34. The sealing ring 18 on the control sleeve 13 separates the upper pressure space 33 from an annular space 37 alongside the outer surface 14 of the control sleeve 13. The space 37 is in permanent communication with the return space 32. In this way the outer surface 14 of the sleeve 13 is not under load.

Although there is no positive connection between the steering spindle 5 and the steering nut 8, when the spindle turns the nut must also turn or move up (or down) the thread on the spindle and in so doing move the piston 2 up (or down) against the resistance of the rack and sector gear. At least at the start of each control movement the former encounters less resistance so the nut turns.

Looking at FIG. 2, when in steering a vehicle the spindle 5 is turned anti-clockwise, the control piston 12 turns anit-clockwise relative to the control sleeve 7, oil flow along channels 29 towards channels 30 leading to the lower pressure space 34 is blocked and oil flow towards the discharge channels 36 is also blocked. however, oil flows from the channels 29 through the bore 35 to the exterior of the tube 20, and around spindle 5 to the upper pressure space 33 to displace working piston 2 downwardly, as viewed. During this movement of the working piston 2 the oil passes from space 34 via channels 36 and 30 to the low pressure return space or crank space 32 disposed around a sector gear in meshing engagement with rack teeth formed on the outer surface of the working piston 2.

When the spindle 5 is turned in the opposite angular sense, the control piston 12 rotates clockwise to block oil flow from the channel 29 towards channels 35 and opens oil flow towards channels 36, whereby the pressure oil passes to space 34 and pushes piston 2 upwardly. During this movement of the piston 2 the oil passes from space 33 around spindle 5 and via channels 35 and 30 to the space 32.

A spring 38 (see FIG. 5) maintains the control piston 12 and the nut 8 connected therewith in their basic position when the spindle 5 is not under load. The center or mean position of the control is ensured by a rib 39 on the nut 8 and a rib 40 on the abutment 10 (see FIG. 4). The ribs 39, 40 have the same width and the spring 38 engages their side surfaces. Turning the nut 8 and thus control movement of control piston 12 can only occur against deformation of the spring 38. After the end of a control or steering movement the spindle 5 is unloaded, the spring 38 returns the nut 8 to the center position and the nut 8 restores the piston 12 via the member 11.

On large movements of the spindle 5 or failure of the hydraulic system, the shaft 23 is turned directly, since the nut 8 turns alone as far as the spring 38 allows and then moves up or down the thread on the spindle 5 taking the piston 2 with it. The teeth 22 meshing with the teeth 24 then turn the shaft 23.

A pin 41 in FIG. 2 secures the sleeve 13 against rotation in the piston 2. However, in the alternative arrangement of FIG. 3 adjustment of the relative angular position of sleeve 13 and piston 12 is possible. To this end, screws 42 in the piston 2 bear on surfaces 43 formed on the sleeve 13, to allow continuous rotary adjustment of the sleeve 13 relative to the piston 12, whereby to enable the center or neutral position of the steering to be adjusted, and fixed in that position by tightening the screws 42.

What is claimed is:

1. Hydraulic servo steering gear comprising
   a steering shaft,
   a double-acting working piston,
   a housing in which said working piston is accommodated,
   a rack and sector gear connection between said steering shaft and said working piston,
   a steering spindle journalled in said housing which, in operation, is rotated to control steering,
   a steering nut, journalled in said working piston, in threaded engagement with the steering spindle,
   first and second abutment elements secured relative to the steering nut and the working piston, respectively to limit angular movement of the steering nut relative to the working piston,
   resilient means fixed between the steering nut and the working piston and, in operation, tending to restore the steering nut and the working piston to a predetermined relative angular position when movement from the said predetermined position occurs,
   a bore defined in said working piston,
   a piston and sleeve type control mechanism arranged in said bore,
   an inlet communicating with a chamber disposed within the outer periphery of the sleeve, said inlet enabling high pressure liquid to enter said steering gear and thereby reach said chamber,
   said housing having an outlet enabling low pressure liquid to leave said steering gear,
   an entraining member connecting the steering nut to the piston of the said control mechanism,
   securing means positioned to secure said sleeve against angular displacement within said bore of the working piston,
   the piston of the control mechanism defining a first channel forming part of a connection between said chamber and a high pressure space at one end of the working piston,
   the sleeve of the control mechanism defining a second channel forming part of a connection between said chamber and a further high pressure space at the other end of the working piston,
   angular movement of the piston of the said control mechanism relative to the sleeve in one direction tending to connect the first channel but not the second channel to said inlet for high pressure liquid, and angular movement of the piston of the said control mechanism relative to the sleeve in the other direction tending to connect the second channel but not the first channel to said inlet for high pressure liquid,
   the sleeve having a substantially cylindrical outer surface and fitting loosely in said bore in a radial sense, and
   adjacent each end of the control sleeve a respective one of two ring seals is disposed on the outer cylindrical surface of the sleeve to form an annular space due to said loose fitting, said annular space being defined between said two ring seals and being in flow connection with a liquid return space communicating with said outlet.

2. Hydraulic servo steering gear according to claim 1, wherein the said securing means are adjustable to allow angular adjustment of the said sleeve.

3. Hydraulic servo steering gear according to claim 1, wherein said ring seals are resilient and are effective to maintain the said sleeve centered in the said bore.

4. Hydraulic servo steering gear comprising
   a steering shaft,
   a double-acting working piston,
   a housing in which said working piston is accommodated,
   a rack and sector gear connection between said steering shaft and said working piston,
   a steering spindle journalled in said housing, which in operation, is rotated to control steering,
   a steering nut, journalled in said working piston in threaded engagement with the steering spindle,
   first and second abutment elements secured relative to the steering nut and the working piston, respectively, to limit angular movement of the steering nut relative to the working piston,
   resilient means fixed between the steering nut and the working piston and, in operation, tending to restore the steering nut and the working piston to a predetermined relative angular position when movement from the said predetermined position occurs,
   a cylindrical bore defined in said working piston,
   a piston-and-sleeve type control mechanism arranged in said bore,
   said sleeve of said control mechanism being generally cup-shaped and having a substantially cylindrical side wall and a planar end wall, the sleeve rotatably receiving the piston of the control mechanism within said cylindrical side wall,
   an inlet communicating with a chamber disposed within the outer periphery of the side wall of the sleeve and serving to enable high pressure liquid to enter the servo steering gear and then flow into said chamber,
   said housing having an outlet enabling low pressure liquid to leave said steering gear,
   an entraining member connecting the steering nut to the piston of the said control mechanism,
   securing means positioned to secure said sleeve against angular displacement within said bore of the working piston,
   the piston of the control mechanism defining a first channel forming part of a connection between said chamber and a high pressure space at one end of the working piston,
   the sleeve of the control mechanism defining a second channel forming part of a connection between said chamber and a further high pressure space at the other end of the working piston,
   angular movement of the piston of the said control mechanism relative to the sleeve in one direction tending to connect the first channel but not the second channel to said inlet for high pressure liquid, and angular movement of the piston of the said control mechanism relative to the sleeve in the other direction tending to connect the second channel but not the first channel to said inlet for high pressure liquid,
   the sleeve fitting loosely in said cylindrical bore in a radial sense, and
   adjacent each end of the control sleeve a respective one of two ring seals is disposed on the outer cylindrical surface of the sleeve,
   said loose fitting of the sleeve in the bore defining an annular space which is defined between said bore and a radially outer wall of the sleeve, said annular space extending over the major length of said cylindrical side wall and between said two ring seals, said annular space being in permanent communication with said outlet.

5. Hydraulic servo steering gear as claimed in claim 4, wherein the steering spindle has a central bore which communicates with said inlet, said steering gear additionally comprising a tube slidably received in said bore in the steering spindle, the piston of the control mechanism having a central bore, and the tube passing through said spindle bore, also passing through said piston bore and communicating with said chamber, such that high pressure liquid entering the inlet passes through the central bore in the steering spindle, through said tube and thence into said chamber.

* * * * *

UNITED STATES PATENT AND TRADEMARK OFFICE
CERTIFICATE OF CORRECTION

PATENT NO. : 4,230,020
DATED : October 28, 1980
INVENTOR(S) : Ivony et al.

It is certified that error appears in the above-identified patent and that said Letters Patent are hereby corrected as shown below:

In column 2, lines 54 and 55, delete "the sleeve fitting loosely for high pressure liquid".

Signed and Sealed this

Twenty-fourth Day of February 1981

[SEAL]

Attest:

RENE D. TEGTMEYER

Attesting Officer

Acting Commissioner of Patents and Trademarks